United States Patent [19]
Eriksson et al.

[11] Patent Number: 5,810,128
[45] Date of Patent: Sep. 22, 1998

[54] SHOCK ABSORBER

[75] Inventors: Magnus Eriksson, Knivsta; Niklas Fagrell, Taby; Lennart Larsson, Vasby, all of Sweden

[73] Assignee: Yamaha Hatsudoki Kabushiki Kaisha, Iwata, Japan

[21] Appl. No.: 650,375

[22] Filed: May 20, 1996

[30] Foreign Application Priority Data

May 18, 1995 [SE] Sweden ................... 9501847

[51] Int. Cl.⁶ .................................................. F16F 9/48
[52] U.S. Cl. ............... 188/289; 188/322.15; 188/322.22; 188/317; 188/319.2; 188/285; 188/320
[58] Field of Search .................... 188/289, 317, 188/281, 282, 318, 316, 280, 284, 285, 286, 287, 322.22, 322.15, 319, 320, 319.1, 319.2, 282.5, 282.1, 282.8; 244/104 FP; 293/134; 267/116, 139, 140, 64.18, 64.22, 64.15; 213/43, 223

[56] References Cited

U.S. PATENT DOCUMENTS

| | | | |
|---|---|---|---|
| 1,459,365 | 6/1923 | Dains ................................ | 293/134 |
| 1,780,531 | 11/1930 | Messier .............................. | 267/64.22 |
| 2,224,306 | 12/1940 | Krueger ............................. | 267/64.22 |
| 2,440,353 | 4/1948 | Wallace . | |
| 2,649,937 | 8/1953 | Crabtree ............................ | 188/317 |
| 2,649,938 | 8/1953 | Crabtree ............................ | 188/317 |
| 2,740,500 | 4/1956 | Brundrett et al. ................ | 188/322.15 |
| 2,780,321 | 2/1957 | Sturari .............................. | 188/319 |
| 2,825,427 | 3/1958 | Steibel .............................. | 188/319 |
| 2,879,987 | 3/1959 | Cussons . | |
| 3,134,460 | 5/1964 | De Carbon ...................... | 188/322.15 |
| 3,147,826 | 9/1964 | McHenry ......................... | 188/282 |
| 3,882,977 | 5/1975 | Watanabe ......................... | 188/282 |
| 3,887,224 | 6/1975 | Browne ............................ | 188/289 |
| 3,888,436 | 6/1975 | Sealey .............................. | 244/104 FP |
| 3,972,551 | 8/1976 | Fannin ............................. | 293/134 |
| 4,106,596 | 8/1978 | Hausmann ....................... | 188/282 |
| 4,226,408 | 10/1980 | Tomita et al. ................... | 267/64.22 |
| 4,405,119 | 9/1983 | Masclet et al. .................. | 267/64.22 |
| 4,624,346 | 11/1986 | Katz ................................. | 188/322.15 |
| 4,632,228 | 12/1986 | Oster et al. ...................... | 188/322.15 |
| 4,671,392 | 6/1987 | Wössner .......................... | 188/322.22 |
| 4,934,749 | 6/1990 | Folarin ............................. | 267/64.22 |
| 4,936,424 | 6/1990 | Costa ............................... | 267/64.22 |
| 5,248,014 | 9/1993 | Ashiba ............................. | 188/322.15 |

FOREIGN PATENT DOCUMENTS

| | | | |
|---|---|---|---|
| 353087 | 6/1905 | France ............................. | 188/317 |
| 1214167 | 7/1958 | France ............................. | 188/289 |
| 1210339 | 2/1966 | Germany ......................... | 188/289 |
| 2250385 | 4/1973 | Germany ......................... | 267/64.22 |
| 2310237 | 9/1973 | Germany ......................... | 188/289 |
| 56-52644 | 5/1981 | Japan ............................... | 188/317 |
| 2195038 | 8/1990 | Japan ............................... | 188/289 |
| 3113139 | 5/1991 | Japan ............................... | 188/289 |
| 6101735 | 4/1994 | Japan ............................... | 188/289 |
| 2202921 | 5/1988 | United Kingdom . | |

*Primary Examiner*—Douglas C. Butler
*Attorney, Agent, or Firm*—Knobbe, Martens, Olson & Bear LLP

[57] ABSTRACT

An improved shock absorber for a vehicle suspension system that incorporates an internal damping arrangement that permits a smooth transition between first and second damping rates. The mechanism includes a metering rod that is mounted in such a way that it will self-adjust in its position relative to a bore extending through the piston rod. An arrangement is disclosed for mounting the pistons on the piston rod so as to permit control of their positions without necessitating threaded adjusting devices.

6 Claims, 3 Drawing Sheets

SHOCK ABSORBER

BACKGROUND OF THE INVENTION

This invention relates to a shock absorber and more particularly to an improved low cost, nonlinear damping shock absorber useable for vehicle suspension systems, among other things.

The functioning of a shock absorber in the suspension system for a vehicle is well known. Although the purpose of the shock absorber is well known, the design details are very important in the performance of the shock absorber.

In many forms of vehicle suspension systems, the shock absorber and/or suspending spring are loaded through a linkage system so as to provide the nonlinear damping characteristic. Conventional shock absorbers are generally linear in their damping. That is, the damping rate is substantially independent of the position in the suspension travel. However, for vehicle suspensions this is not the optimum design under many instances.

For example, during small suspension movements it is desirable to have a relatively soft acting suspension. In this way, small undulations in the road will be effectively isolated from the occupants of the vehicle. On the other hand, such soft damping rates require large suspension movement so as to accommodate larger bumps that may be encountered. Therefore, it has been proposed to provide a linkage system for loading the suspension element so that there will be soft damping over small obstacles and the damping will become progressively firmer as the wheel displacement relative to the vehicle increases. These types of linkage systems obviously add to the cost of the vehicle and also make it more difficult to position and load the elements of the suspension system.

There have been proposed, therefore, a wide variety of types of damping mechanisms that are nonlinear in their characteristics. These damping mechanisms provide relatively small damping rates under small suspension travels and become progressively stiffer as the displacement increases. The effective use of the systems can substantially simplify the overall vehicle suspension system. However, this type of damper does present substantial cost penalties particularly since the internal components must be accurately positioned and assembled.

For example, there has been proposed a type of shock absorber wherein the piston rod carries two damping pistons. The piston rod is also provided with an axially extending bore that is controlled by a metering rod that is fixed to the cylinder and which enters and restricts the flow through this bore as suspension travel increases. Thus, when there is small suspension travel the two damping pistons act in series and provide a relatively low damping rate. However, as the displacement increases and the metering rod enters the piston rod bore one of the pistons is effectively bypassed to a varying degree and the suspension becomes stiffer.

Although this type of system has a number of advantages, the positioning of the metering rod relative to the piston and its bore present a number of problems in connection with assembly and adjustment. If the metering rod and piston are accurately positioned, the total cost of assembly and manufacture can become quite high.

It is, therefore, a principal object of this invention to provide an improved shock absorber of this type that can be produced at lower cost and which will nevertheless provide good results without accurate assembly and/or manual adjustment.

In connection with this type of shock absorber, the axial spacing between the pistons and their transverse location on the piston rod is obviously important to provide good suspension characteristics. In addition, an assembly method should be employed that permits a basic construction to be varied to specific vehicle applications. That is, it may be desirable to change the axial distance between the two pistons and each of their axial positions order to change the damping characteristics. However, by utilizing normal mounting techniques, the cost of the piston and piston rod assembly becomes quite high.

It is, therefore, a still further object of this invention to provide an improved piston construction for such a shock absorber.

SUMMARY OF THE INVENTION

A first feature of this invention is adapted to be embodied in a hydraulic shock absorber that is comprised of a cylinder which defines an internal bore. A piston rod is adapted to extend into the internal bore and carries at least one damping piston thereon for dividing the internal bore into first and second fluid chambers. The piston provides first damping means for damp fluid flow therethrough from one of the chambers to the other of the chambers for providing hydraulic resistance to relative movement of the piston rod relative to the cylinder. The piston rod is formed with an axially extending bore that extends from one end thereof along a length of the piston rod to provide a bypass passage around the damping means of the piston between the first and second fluid chambers. A metering rod is carried by the cylinder and is adapted to enter into the piston rod bore for restricting the flow through the passage upon a predetermined degree of movement of the piston rod relative to the cylinder for changing the effective damping rate of the shock absorber. The metering rod is axially fixed to the cylinder by a mounting arrangement and which mounting arrangement permits transverse movement of the metering rod relative to the cylinder so as to align itself properly with the piston rod bore. A resilient frictional member is interposed between the cylinder and the metering rod for permitting this transverse movement while at the same time retaining the metering rod in position when no transverse forces are exerted on it so as to eliminate the necessity for adjustment of the metering rod position relative to the piston rod bore.

Another feature of the invention is also adapted to be embodied in a hydraulic shock absorber that is comprised of a cylinder that defines an internal bore. A piston rod extends into the bore. One end of the piston rod is formed with a reduced diameter portion so as to form a shoulder. A first piston is received on the reduced diameter portion and is held in axial position by the shoulder. A spacer member is interposed between the first piston and a second piston that is also supported on the reduced diameter end portion of the piston rod. A fastener holds the second piston in engagement with the spacer member and the first piston in engagement with the shoulder for axially affixing the pistons on the piston rod.

DETAILED DESCRIPTION OF THE PREFERRED EMBODIMENT OF THE INVENTION

Figure 1:
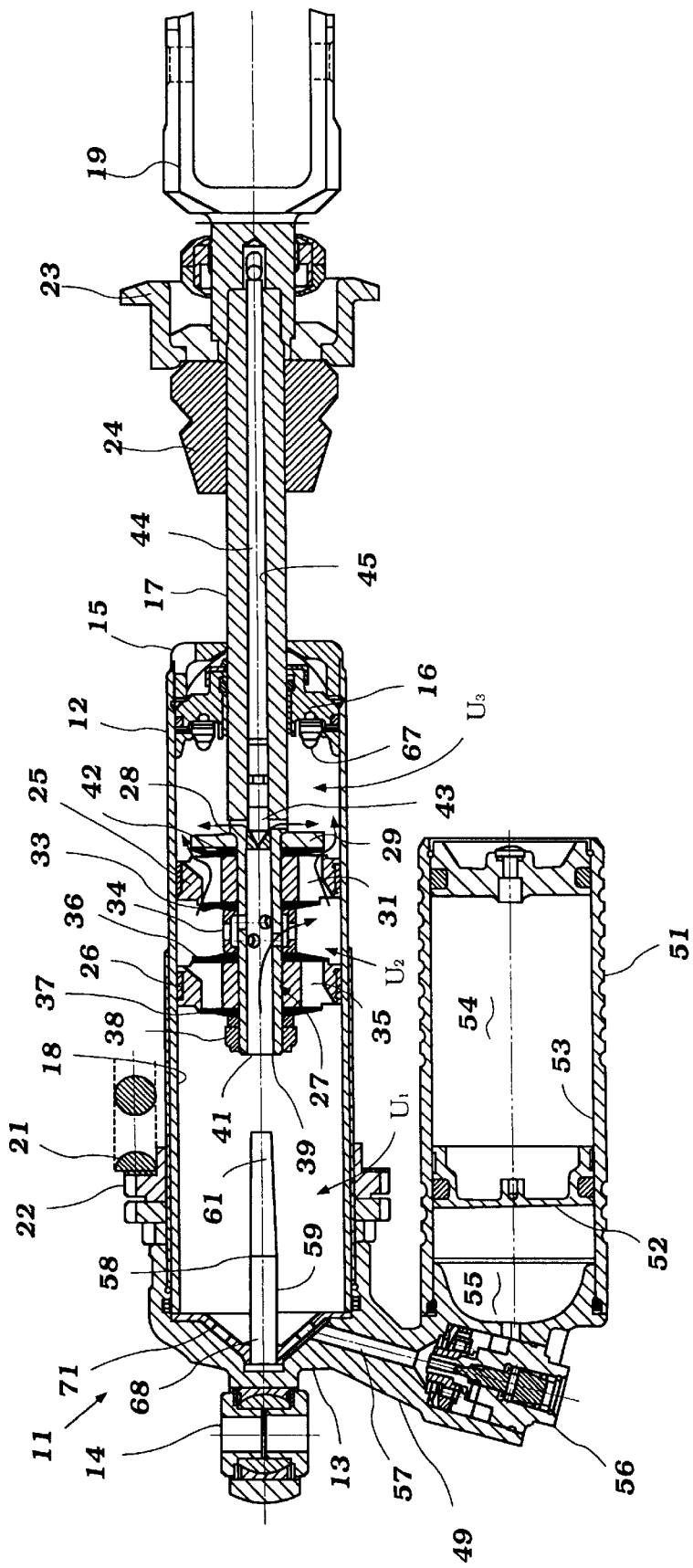
FIG. 1 is a cross-sectional view of a hydraulic shock absorber and vehicle suspension system constructed in accordance with an embodiment of the invention.

Referring now in detail to the drawings and initially to FIG. 1, a vehicle suspension system constructed in accordance with an embodiment of the invention is identified generally by the reference numeral 11. The vehicle suspension system 11 is designed to be interposed between a vehicle chassis, indicated at CH, and a wheel-carrying hub, indicated at H, in a manner known in the art. However, it should be understood that the suspension unit 11 is designed so as to provide a variable damping force and thus can eliminate the use of linkage systems for providing variable damping rates. Of course, the suspension unit 11 may also be used in combination with such a variable linkage system so as to provide still further variations in the suspension characteristics during varying degrees of wheel travel.

The suspension unit 11 includes a cylinder assembly, indicated generally by the reference numeral 12 which is provided with a first end closure 13 at what may be considered to be the blind end thereof. This end closure 13 carries a trunion 14 so as to provide a pivotal connection to the aforenoted chassis CH.

The opposite end of the cylinder 12 is closed by an end closure 15 that carries a sealing gland 16. A piston rod, indicated generally by the reference numeral 17 extends through this sealing gland 16 in sealing arrangement therewith. The cylinder 12 is defined with a cylinder bore 18 that is closed at one end by the end closure 13 and at the other end by the gland 16. The piston rod 17 has an elongated portion on which is carried a yoke 19 that provides the connection to the aforenoted hub or wheel H.

A coil compression spring 21 encircles the cylinder 12 and the exposed end of the piston rod 17. One end of this spring 21 bears against a collar 22 that is adjustably connected to the cylinder 12. The opposite end of the spring 21 bears against a spring retainer 23 carried by the piston rod 17 adjacent the yoke 19. Thus, the spring 21 will be loaded as the piston rod 17 moves relative to the cylinder 12 upon suspension movement of the wheel or hub H relative to the chassis CH.

An elastomeric snubber 24 is carried by the spring retainer 23 and will engage with the end closure 15 so as to provide a cushioned but positive stop limiting the total compression of the suspension unit 11.

The suspension unit 11 also includes a hydraulic damping mechanism. This hydraulic damping mechanism is comprised of a first damping piston 25 and a second damping piston 26 that are supported on the piston rod 17 within the cylinder bore 18 so as to define a first fluid chamber $U_1$ between the piston 26 and the end closure 13, a second fluid chamber $U_2$ between the two pistons 25 and 26 and a third fluid chamber $U_3$ between the first fluid piston 25 and the gland 16.

The mechanism for supporting the pistons 25 and 26 on the piston rod 17 permits adjustment or variations from shock absorber to shock absorber or for specific applications in the distance between the pistons 25 and 26 and also the axial position of the pistons 25 and 26 on the piston rod 17. To this end, the piston rod 17 is provided with a reduced diameter end portion 27 which forms a shoulder 28. A spacer plate 29 is interposed between the shoulder 28 and the first piston 25. By varying the thickness of the spacer plate 29 and/or the axial position of the shoulder, the axial position of the piston 25 on the piston rod 17 can be adjusted.

The piston 25 is formed with damping flow passages 31 which extend therethrough. A first damping valve assembly 32 such as a stack of springs or shims is interposed between the spacer plate 29 and the piston 25 and controls the flow from the chamber $U_2$ to the chamber $U_3$. A second set of damping valve springs or shims 33 is interposed between the opposite side of the piston 25 and a spacer sleeve 34 received on the reduced diameter portion 27 of the piston rod 17. These springs 33 act as check valves to control the pressure at which flow from the chamber $U_3$ to the chamber $U_2$ occurs.

The spacer sleeve 34 has an axial length which can be varied so as to control the spacing between the pistons 25 and 26 and, accordingly, the axial position of the piston 26 on the piston rod 17.

Like the piston 25, the piston 26 has a series of flow passages 35 that extend therethrough. Flow from the chamber $U^1$ to the chamber $U_2$ occurs through certain of these passages 35 at a rate controlled by a damping valve spring or shim arrangement 36. This shim arrangement 36 is retained between the piston 26 and the spacer ring 34.

Flow in the opposite direction is controlled by spring or shim arrangements 37 which are disposed on the opposite side of the piston 26. The piston 26 and the shims 36 and 37 are held axially relative to the spacer ring 34 by a nut 38 that is threaded onto the end of the piston rod 17 and specifically its reduced diameter portion 27. Hence, the pistons 26 and their associated flow controlling springs 32, 33, 36, and 37 are fixed in axial and circumferential directions by this mechanism. Thus, the axial positions can be adjusted as aforenoted without utilizing threaded connections and also welding and other more permanent attachment mechanisms can be avoided.

In addition to the damping provided by the pistons 25 and 26 and their flow arrangements, a further control damping arrangement is incorporated so as to provide a variable rate of damping. To this end, the end 39 of the piston rod 17 that extends into the chamber $U_1$ is provided with a central bore 41. This central bore 41 extends generally to the area where the shoulder 28 is formed.

There is provided an orifice plate 42 that is at least partially closed by an adjustable metering pin 43. The position of the metering pin 43 is controlled by an adjusting rod 44 that extends through a further bore 45 formed at the base of the bore 41 and terminating at the orifice plate 42. This adjustment rod 44 permits external adjustment of the damping flow through the orifice plate 42 controlled by the metering pin 43.

Figure 3:
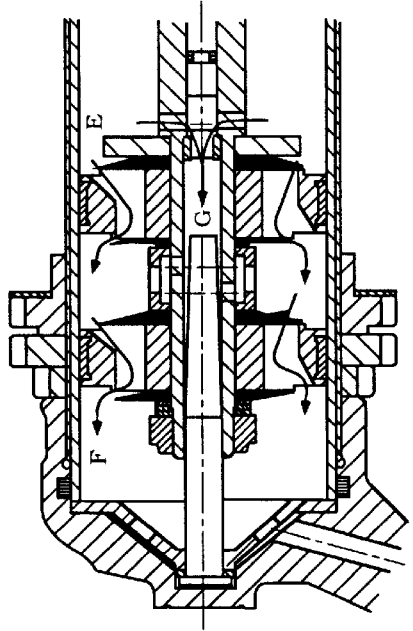
FIGS. 3, 4, 5 and 6 are partial cross-sectional views, in part similar to FIG. 1, and show progressively increasing
Figure 4:
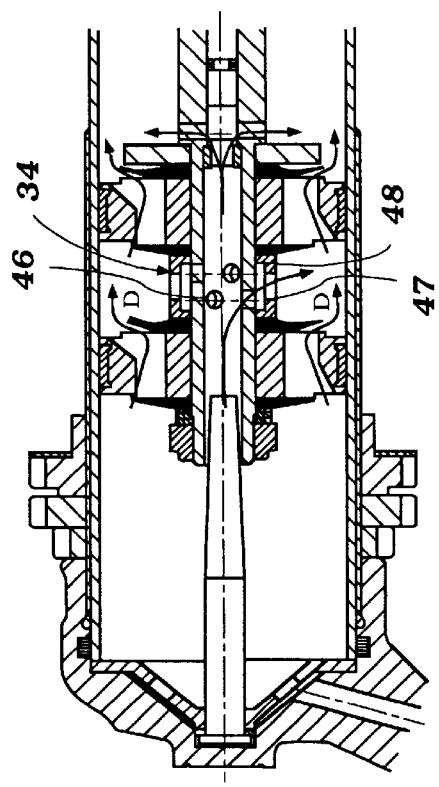

As may be best seen in FIGS. 3–4, the portion of the reduced diameter part 27 of the piston rod 17 between the pistons 25 and 26 is provided with a plurality of radially extending flow passages 46. These flow passages 46 communicate with a flow recess 47 formed in the spacer plate 34 and which in turn communicate with further flow passages 48 so as to permit flow through the piston central passage 41 into the area $U_2$ from the area $U_1$ bypassing the damping action of the piston 26 as seen by the flow arrows B in FIG. 1. In addition, there can be flow through the path C directly from the chamber $U_1$ to the chamber $U_3$.

Obviously when the piston rod 17 moves in a direction so that the pistons 26 and 25 will compress the fluid in the chamber $U_1$, more fluid will be displaced from the chamber $U_1$ than can be accommodated in the chamber $U_3$ due to the displacement of the piston rod 17. Therefore, the end closure 13 is provided with an extension 49 that communicates with an accumulator chamber 51 affixed thereto.

A floating piston 52 is contained within a bore 53 of the accumulator chamber 51. An inert gas such as nitrogen may fill a chamber 54 formed on one side of the floating piston 52 so as to maintain a light fluid pressure on the fluid in the shock absorber chambers $U_1$, $U_2$, $U_3$ and in a chamber 55 formed on the head of the floating piston 52. An adjustable flow control valve 56 is provided in the communication passageway 57 from the chamber $U_1$ to the chamber 55 so as to further adjust the damping characteristics of the device.

In order to provide the variable damping, a metering rod indicated generally by the reference numeral 58 is mounted on the end closure 31 in a manner which will be described. The metering rod 58 has a cylindrical portion 59 which terminates in a tapered metering part 61 that is adapted to enter into the piston rod bore 41 and control the flow therethrough. The metering rod 58 extends approximately one-fourth of the length of the cylinder bore 18 and is designed so as to enter into the piston bore 41 when the suspension movement has caused the piston rod 17 to move to the position shown in FIG. 3.

Prior to this time and as has been noted, all of the fluid displaced from the chamber $U_1$ and which flows to the chamber $U_3$ will pass through either the flow path B which includes entering the chamber $U_2$ and then flowing through the piston passages 31 controlled by the valves 32 into the chamber $U_3$ or through the path C controlled by the metering pin 43. This damping was of a relatively low amount.

However, when the piston rod 17 has moved to the position shown in FIG. 3, then the metering rod portion 61 will restrict to some extent the flow through the paths B and C and open up a further path indicated by the arrows D through the passages 35 of the piston 26 valved by the damping valve members 36. This then provides a higher degree of damping and a stiffer suspension movement.

Upon continued suspension movement to the position shown in FIG. 4, the cylindrical portion 59 of the metering rod 58 will enter into the piston rod bore 41 and substantially totally obstruct the flow from the chamber $U_2$ through this passage. Thus, there will be then flow through the paths D and some flow through the path C. Flow through the path C occurs because the passages 48, 47 and 46 are still substantially unrestricted. Thus, an even higher damping rate is provided under this circumstance. Thus, the damping varies progressively from the below damping rate provided in the arrangement shown in FIG. 1 to the higher damping rate shown in FIG. 3 and finally to the highest damping rate shown in FIG. 4.

Figure 5:
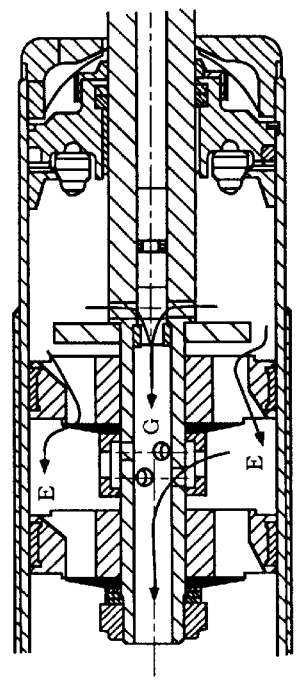
Figure 6:
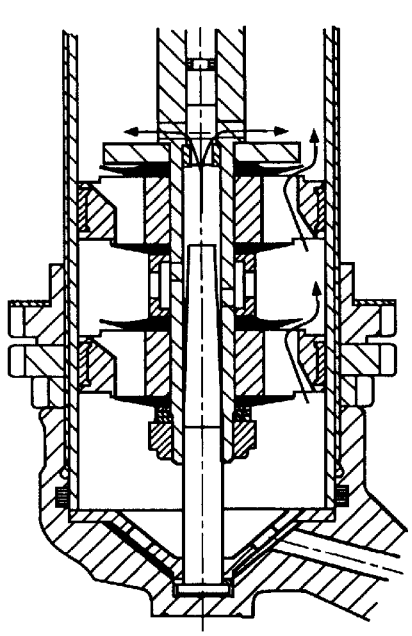

Return flow occurs in the opposite sense beginning with the position shown in FIG. 5 wherein there is a first flow path E and F through the damping pistons 25 and 26 controlled by their respective valve elements 33 and 37 and also the flow through the path G controlled by the metering pin 43. Upon continued movement, the metering rod 58 will be withdrawn gradually from the piston rod bore 41 and the reduced rate of damping flow through the paths G and E will then result upon continued return movement. The total return movement will occur up to a point when the stopper plate 29 engages resilient stoppers 62 carried by the end closure and guide 16.

Therefore, from the foregoing description it should be readily apparent that the shock absorber mechanism provides very effective damping.

Of course, it is necessary to ensure that the center axis, indicated by the line 68 in FIG. 1 of the metering rod 58 is located so that it can freely pass into the piston rod bore 41. The mounting arrangement shown in FIG. 2 accomplishes this operation without necessitating manual adjustments or close fits.

In this figure, the axis of the piston rod bore 41 is shown at 69. It may be seen that the solid line view of this figure the metering pin axis 68 is substantially offset from the axis 69 and the unit can be assembled in this way. However, on the first stroke of the piston rod 17, a centering action will occur which will cause the metering rod 58 to be centrally disposed on further operation of the suspension element 11.

The metering rod 58 is held axially in position and its transverse motion controlled by means that include a supporting plate, indicated generally by the reference numeral 71 and which has a generally frusto-conical-shaped part. This part terminates at a shoulder 72 which faces a headed portion 73 formed on the metering rod 58. This headed portion 73 is received in a cylindrical recess 74 formed by the end closure 13. This recess 74 is sized so as to provide a clearance.

The metering rod headed portion 73 has an end surface 75 that is held in engagement with an end part 76 formed at the base of the end closure recess 74. The sizing of the recess 74 relative to the headed portion 73 of the metering rod 58 is chosen so as to permit the variation in the radial position within a certain range so that the tapered portion 61 of the metering rod 58 can always contact the inner surface of the piston rod bore 41 regardless of the initial assembly. Generally, the space between the opening 72 and the holder member 71 and the cylindrical portion 59 of the metering rod 58 is in the range of about 0.5 mm.

The headed portion 73 is formed with a surface 77 that is engaged by an O-ring 78 that is trapped between this surface and a shoulder 79 of the holder member portion 72. This provides a frictional force F acting in an axial direction which is adequate to hold the surfaces 75 and 76 in engagement to provide the axial location but also to permit some transverse direction as indicated by the arrow 81.

Hence, if the metering rod 58 is offset to the extreme position shown in the solid line view of this figure, upon the initial stroke the tapered end portion 61 will engage the side of the piston rod bore 41 and a transverse force indicated at $F_1$ will be exerted on the metering rod 58. This force exceeds the resistance of the O-ring 78 and permits the metering rod 58 to shift in the direction of the arrow 81 to a new dotted line position. This total shifting will occur at the time the cylindrical portion 59 of the metering rod 58 enters the piston rod bore 41.

Figure 2:
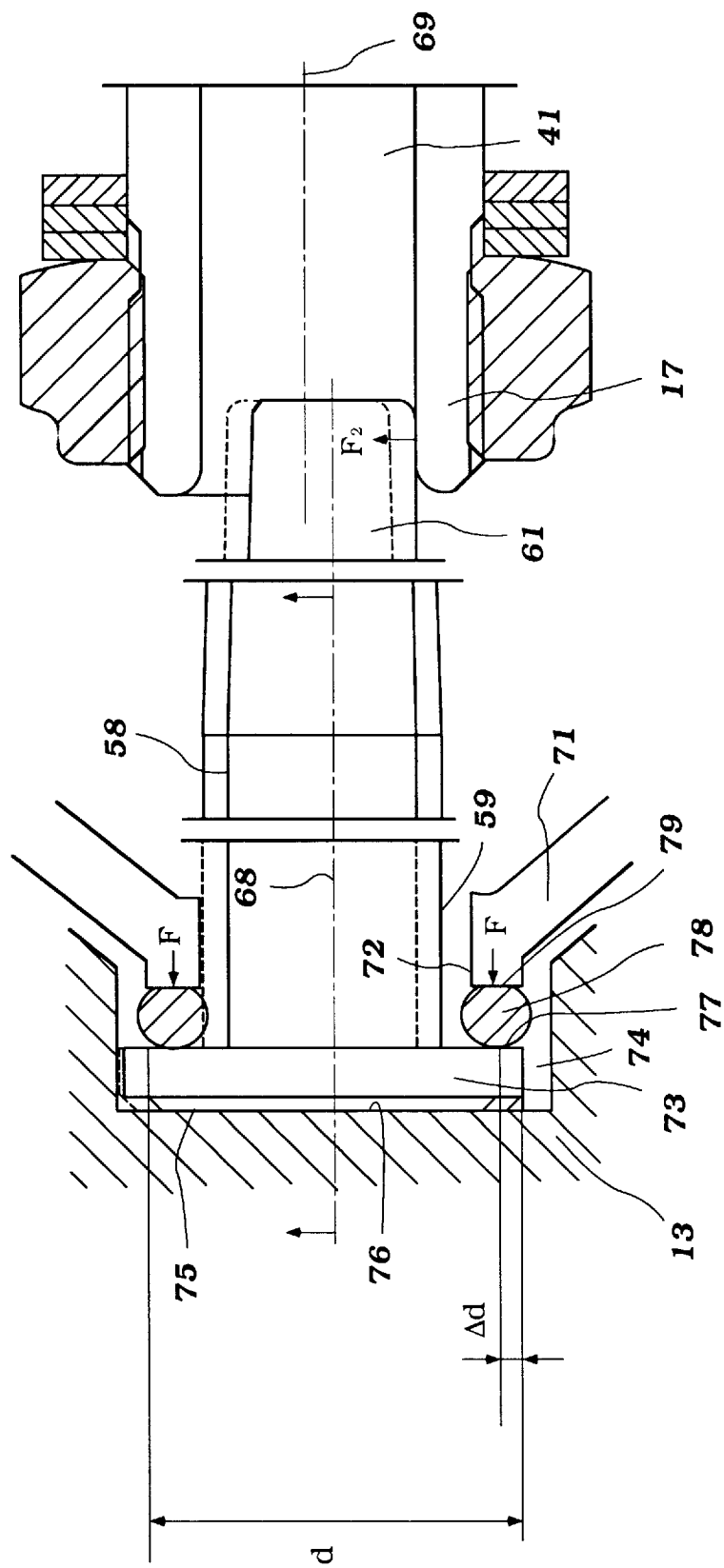
FIG. 2 is an enlarged cross-sectional view showing the mounting of the metering rod and how it self-adjusts.

Because of the taper 61 of the metering rod 58, this movement can be smooth and without binding. Hence, there will be an amount of diametral shifting of the metering rod headed portion 73 which has a diameter D in the amount δD as shown in FIG. 2 so as to accommodate and accomplish this centering action.

Therefore, it should be readily apparent that the described construction not only provides a very effective variable rate shock absorber but also one which can be made in relatively low cost and can be easily changed for specific vehicular applications.

This arrangement also eliminates the necessity of linkage systems to provide variable rate and can be tuned to provide the optimum shock absorbing and damping function. This is accomplished by the following stages:

Stage 1—Selection of the attachment points between the frame or chassis CH and wheel or hub H where the best possible transmission curve of operation can result.

Stage 2—Utilization of this transmission curve so as to convert the damping curve for the wheel to the desired ratio.

Stage 3—Converts the damping curves of the shock absorber with this transmission curve to give optimal position dependent shock absorber performance in the various positions of travel.

Stage 4—The shock absorber 11 gives four different damping curves two for compression movement and two for return movement with a stepless transmission between them because of the conical portion 61 of the metering rod 58. These positions can correspond to a drive position at about one-half of the total wheel movement and progression at the compressed state to the higher rate at about ⅚ of the total wheel movement.

Stage 5—The damping curves are applied as four polynomials. The fourth order for the compression curves and third order for the return curves. At the same time, three or four speeds are selected where the damper would give correct damping forces in the two positions according to the step in stage 4. That is, 8+4=14 polynomial factors and 14 sub-values.

Stage 6—The pressure drop in the flow of oil through the piston rod opening 41 is so great that the valve in the piston is open and takes part of the flow. The sum of the flow through the piston valves and the flow through the center bore is given by the speed of the shock absorber. In order to calculate these flows it is necessary to find the distribution that results in the pressure drop across the two constrictions being the same.

Stage 7—The 14 polynomial factors according to stage 5 and the pressure drop according to stage 6 together give 8+6 damping forces at the 4+3 speeds according to stage 5.

Stage 8—By varying the 14 polynomial factors while satisfying the limitations of stage 6 it is possible to minimize the differences between the 14 actual values and the set values by the method of these squares. The 14 polynomial factors in this way give four different damping curves according to stage 4.

Stage 9—The four damping curves are checked so that they are physically feasible. The biggest problem in compression damping on the piston assembly which is to interact with the operation of the piston rod 41. The center character of the center hole is progressive to provide a quadratic curve and at high piston speeds which occur mainly during the compression movement the value of the second piston 26 has to take on an ever greater part of the flow. The characteristics of valve must be digressive in order to compensate for the character of the center hole if the total damping curve is to be linear. These damping curves are realizable.

Therefore, it is possible to obtain the desired damping characteristics using this technology and the performance of the shock absorber and suspension element 11 can be optimized.

Of course, the foregoing description is that of a preferred embodiment of the invention and various changes and modifications may be made without departing from the spirit and scope of the invention, as defined by the appended claims.

What is claim:

1. A hydraulic shock absorber comprised of a cylinder defining an internal bore closed by a first end wall, a piston rod extending into said bore and carrying at least one piston thereon for dividing said bore into at least first and second fluid chambers, first damping means for permitting flow between said first and said second fluid chambers through said piston, said piston rod having a passage opening through one end thereof to provide a flow path between said first and said second fluid chambers around said first damping means, and second damping means comprised of a metering rod having an enlarged end portion fixed to said first end wall of said cylinder by attachment means and adapted to enter into said piston rod bore for restricting the flow therethrough upon a predetermined degree of movement of said piston rod within said cylinder, said attachment means being constructed so as to restrain both axial and pivotal movement of said metering rod relative to said cylinder and permit transverse movement of said metering rod relative to said cylinder so as to align with said piston rod bore comprising a cylindrical cavity formed in said one end wall receiving said enlarged end portion and having a larger diameter than said enlarged end portion, said cylindrical cavity being closed at its inner end by a planar surface, a restraining member affixed relative to said one end wall and having an opening therein passing said metering rod with a clearance for accommodating said transverse movement of said metering rod, and frictional damping means comprising a resilient O-ring entrapped between said restraining member and said enlarged head portion for urging said enlarged end portion against said planar surface for retaining said metering rod in the adjusted transverse position, said O-ring having an internal diameter larger than the adjacent diameter of said metering rod so as to permit transverse movement.

2. A hydraulic shock absorber as set forth in claim 1, wherein there is provided a second piston carried by the piston rod in axially spaced position relative to the first mentioned piston and defining a third fluid chamber between said first and said second pistons, and further including third damping means carried by said second piston for controlling the flow between said first fluid chamber and said third fluid chamber.

3. A hydraulic shock absorber as set forth in claim 2, wherein the piston rod bore defines a fluid path directly between the first fluid chamber and the second fluid chamber past both the first and second pistons.

4. A hydraulic shock absorber as set forth in claim 3, further including means providing a fluid path between the piston rod bore and the area between the first and second fluid chambers.

5. A hydraulic shock absorber as set forth in claim 4, wherein the piston rod is formed with a shoulder for cooperating with the pistons for fixing the axial location of the first piston and further including a spacer member interposed around said piston rod between said first piston and said second piston for determining the axial position of said second piston relative to said first piston.

6. A hydraulic shock absorber as set forth in claim 1, wherein the restraining member is affixed relative to the one end wall by being entrapped between said one end wall and said cylinder.

\* \* \* \* \*

UNITED STATES PATENT AND TRADEMARK OFFICE
CERTIFICATE OF CORRECTION

PATENT NO. : 5,810,128
DATED : September 22, 1998
INVENTOR(S) : Magnus Eriksson et al.

It is certified that error appears in the above-identified patent and that said Letters Patent is hereby corrected as shown below:

<u>Title page,</u>
Item [73], Assignees, should be:
-- Yamaha Hatsudoki Kabushiki Kaisha and OhlinsRacing Ab --.

Signed and Sealed this

Sixteenth Day of August, 2005

JON W. DUDAS
*Director of the United States Patent and Trademark Office*